(12) United States Patent
Kamen

(10) Patent No.: US 8,130,233 B2
(45) Date of Patent: *Mar. 6, 2012

(54) MODIFYING SCREEN OBJECTS

(75) Inventor: Yakov Kamen, Cupertino, CA (US)

(73) Assignee: JLB Ventures LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,311

(22) Filed: Apr. 27, 2011

(65) Prior Publication Data

US 2011/0199384 A1    Aug. 18, 2011

Related U.S. Application Data

(63) Continuation of application No. 09/909,630, filed on Jul. 19, 2001, now Pat. No. 7,956,865.

(60) Provisional application No. 60/241,885, filed on Oct. 19, 2000.

(51) Int. Cl.
*G09G 5/00* (2006.01)

(52) U.S. Cl. ........ 345/581; 345/419; 345/589; 345/646; 715/810; 715/821; 715/822; 715/823; 715/824; 715/825; 725/46; 725/47; 725/58

(58) Field of Classification Search ............... None
See application file for complete search history.

(56) References Cited

U.S. PATENT DOCUMENTS

| | | |
|---|---|---|
| 4,621,259 A | 11/1986 | Schepers et al. |
| 5,243,418 A | 9/1993 | Kuno et al. |
| 5,414,773 A | 5/1995 | Handelman |
| 5,479,268 A | 12/1995 | Young et al. |
| 5,485,197 A | 1/1996 | Hoarty |
| 5,526,034 A | 6/1996 | Hoarty et al. |
| 5,532,754 A | 7/1996 | Young et al. |
| 5,550,576 A | 8/1996 | Klosterman |
| 5,550,578 A | 8/1996 | Hoarty et al. |
| 5,684,525 A | 11/1997 | Klosterman |
| 5,704,837 A | 1/1998 | Iwasaki et al. |
| 5,724,492 A | 3/1998 | Matthews, III et al. |
| 5,737,028 A | 4/1998 | Bertram et al. |
| 5,751,282 A | 5/1998 | Girard et al. |

(Continued)

FOREIGN PATENT DOCUMENTS

JP    4100963880 A    4/1998

(Continued)

OTHER PUBLICATIONS

Screen shots 1-3 of Microsoft Sound Recorder 4.0, Software included in Microsoft Windows Microsoft Corp. © 1981-1998.

*Primary Examiner* — Antonio A Caschera
(74) *Attorney, Agent, or Firm* — Banner & Witcoff, Ltd.

(57) ABSTRACT

A system for identifying prior selection of specific display information on an EPG. In one embodiment, a user selects an object on a screen, and upon selection of the object, an attribute of the object (e.g., color, transparency, etc.) is modified. The modified value is saved into memory so the user may later identify that the specific object was selected. Each subsequent selection will modify the attribute further, allowing the user to identity that the object was selected a number of times. In one embodiment, the attribute will continue to be modified until a specific expiration limit has been reached.

27 Claims, 2 Drawing Sheets

U.S. PATENT DOCUMENTS

| | | | |
|---|---|---|---|
| 5,793,438 A | 8/1998 | Bedard | |
| 5,808,613 A | 9/1998 | Marrin et al. | |
| 5,818,441 A | 10/1998 | Throckmorton et al. | |
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |
| 6,002,403 A | 12/1999 | Sugiyama et al. | |
| 6,029,195 A | 2/2000 | Herz | |
| 6,034,678 A | 3/2000 | Hoarty et al. | |
| 6,043,818 A | 3/2000 | Nakano | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,100,883 A | 8/2000 | Hoarty | |
| 6,167,188 A | 12/2000 | Young et al. | |
| 6,205,485 B1 | 3/2001 | Kikinis | |
| 6,205,582 B1 | 3/2001 | Hoarty | |
| 6,233,389 B1 | 5/2001 | Barton et al. | |
| 6,243,039 B1 | 6/2001 | Elliot | |
| 6,256,027 B1 | 7/2001 | Jeong et al. | |
| 6,271,831 B1 | 8/2001 | Escobosa et al. | |
| 6,367,078 B1 | 4/2002 | Lasky | |
| 6,462,784 B1 | 10/2002 | Kohno et al. | |
| 6,463,428 B1 | 10/2002 | Lee et al. | |
| 6,486,920 B2 | 11/2002 | Arai et al. | |
| 6,678,891 B1 | 1/2004 | Wilcox et al. | |
| 7,047,550 B1 | 5/2006 | Yasukawa et al. | |
| 7,956,865 B2 * | 6/2011 | Kamen | 345/581 |

FOREIGN PATENT DOCUMENTS

| | | |
|---|---|---|
| WO | 00-01149 A1 | 1/2000 |

* cited by examiner

MODIFYING SCREEN OBJECTS

CROSS-REFERENCE TO RELATED APPLICATIONS

This application is a continuation of U.S. patent application Ser. No. 09/909,630, filed Jul. 19, 2001, by Yakov Kamen, and entitled "Method and System for Modification of EPG Object Attributes," which claims the benefit of priority from U.S. Provisional Patent Application Ser. No. 60/241,885, filed Oct. 19, 2000, and both applications are incorporated herein by reference in their entirety.

FIELD

The present invention relates to the field electronic programming guides.

BACKGROUND

One of the disadvantages of an object-oriented electronic programming guide (EPG) displayed on a television or other similar screen, as currently implemented, is that a user may find it difficult to recognize and remember the identity of each of the various objects concurrently displayed at any one time. To attempt to aid recognition, the objects may be assigned attributes such as shape, color, brightness, transparency, etc. to help the user identify objects as belonging within a certain category of programming event. However, because a user may select the objects within one category of objects very often, he may not always be able to remember the identity of one particular object, as distinguished from other objects in the same category. He may then want a simple method of determining the identity of a particular display representing a desired category of interest.

It would therefore be desirable to further assist the user to determine the content of an object.

SUMMARY

In one embodiment, a method and system for identifying prior selection of specific display information is disclosed. In one embodiment, the method and system relate to an attribute of a displayed object being connected to a selection procedure wherein a user selects a displayed object and the attribute (e.g. the color blue) of the displayed object increments the display based on the frequency of user selection.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, various aspects of the present invention will be described. However, it will be apparent to those skilled in the art that the present invention may be practiced with only some or all aspects of the present invention. For purposes of explanation, specific configurations are set forth in order to provide a thorough understanding of the present invention. However, it will also be apparent to one skilled in the art that the present invention may be practiced without the specific details. In other instances, well-known features are omitted or simplified in order not to obscure the present invention.

Figure 1:
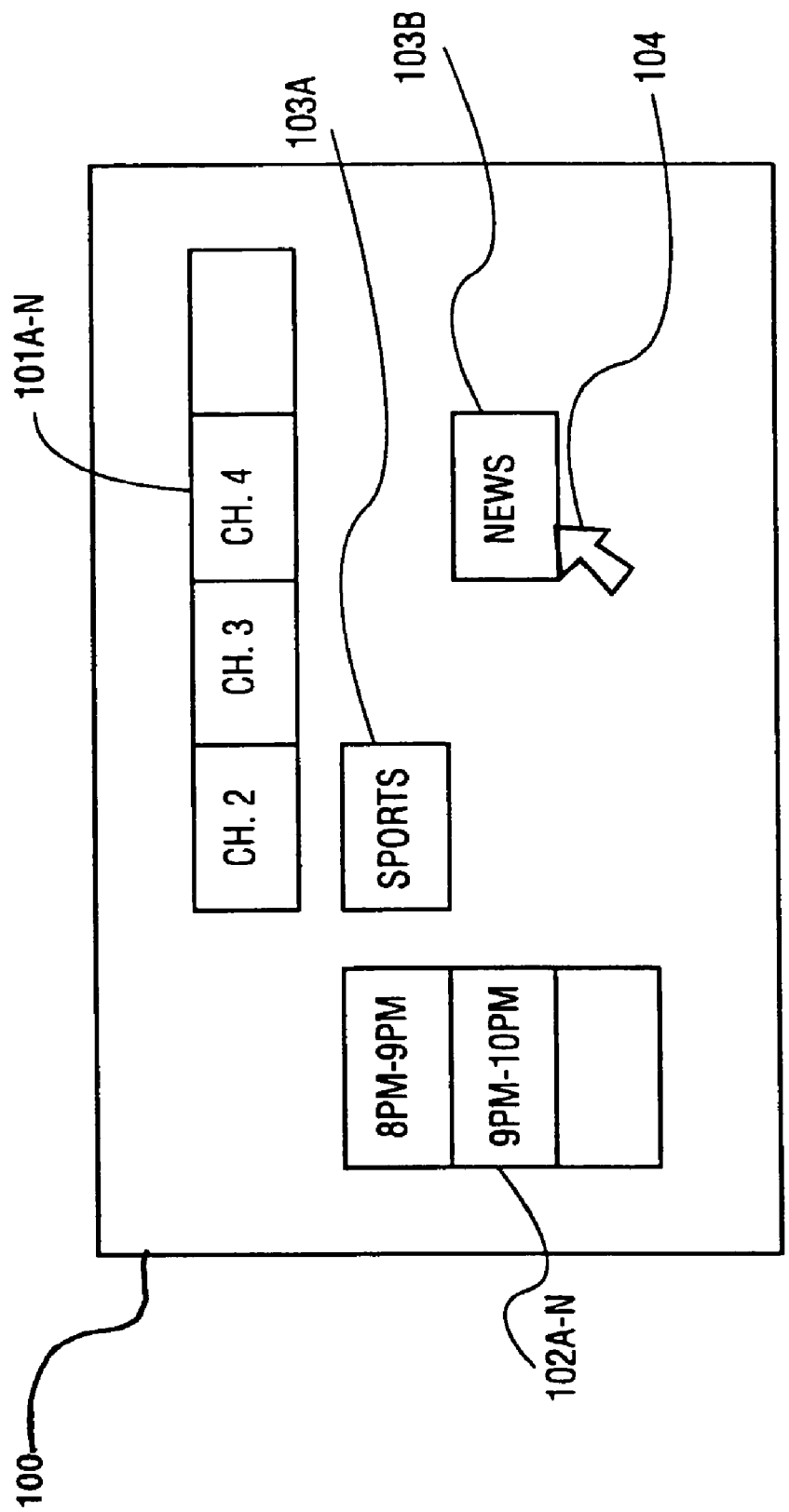
FIG. 1 is a block diagram showing a screen that displays objects to be incremented by a user, according to one embodiment.

FIG. 1 shows an example of an electronic programming guide (EPG). An EPG provides programming information, such as listings of programs, information about the programs, and the times the programs appear, so that a user may access specific programs. Other information may also be displayed, for example, time remaining, ratings, pay-per-view programs, etc. EPGs are generally displayed in a grid-like manner, as shown in FIG. 1. Within a screen 100 are objects 101$a$ through 101$n$ that may display available channel selections (e.g., channel 2, channel 4, etc.). Also within the screen 100 are objects 102$a$ through 102$n$ that may display programming time slots (e.g., 8 p.m.-9 p.m., etc.). Objects 103$a$ through 103$n$ (103$a$ and 103$b$ are only shown in FIG. 1) contain information about the programming event offered to the viewer on the channels and in the time slots covered by objects 101 and 102 (e.g., news, sports). The varying objects 101, 102 and 103 all display information to a user that helps the user decide on viewing options. In alternative embodiments, varying configurations can be used that include more or less objects of different types, without departing from the invention.

The user may want to know, in using the EPG, whether he has recently selected an object (i.e., object 103$b$). However, he may not want to wait for the identity of the object 103$b$ he has selected to appear on the screen 100, only then to recall that this object 103$b$ has already been recently selected. Instead, in one embodiment, each time the user selects an object 101, 102 or 103 that contains specific programming information (e.g., time, channel or programming event), one of the attributes of the object 101, 102 or 103 is modified. For example, a news programming event, such as object 103$b$ has a blue background. On each consecutive (or non-consecutive) selection of the same program object 103$b$, that object 103$b$ will become darker. The object 103$b$ may move, for example, from a royal blue to a navy blue to a dark midnight blue with each consecutive selection. As a result, the user can recognize that he has selected this object 103$b$ already, without needing to reselect the object 103$b$ to ascertain its identity.

In another embodiment, other attributes, such as shape, surface texture, transparency, border color, or position in 3-D space, may be modified each time the user selects that particular object 101, 102 or 103. An example of one embodiment of a modification other than color modification may be a change in the shape of the displayed object. The shape of the object may start as a square and, upon subsequent selection, may change to resemble an oval or other such shape. Other attributes not mentioned here may also be used for purposes of ascertaining recent selection of an object.

In addition, a cursor 104 shown on the screen 100 may be included that can be controlled by a user's pointing device. The pointing device may be one of many such devices well known in the art, such as a remote control, a mouse, a trackball, a joystick, etc.

Figure 2:
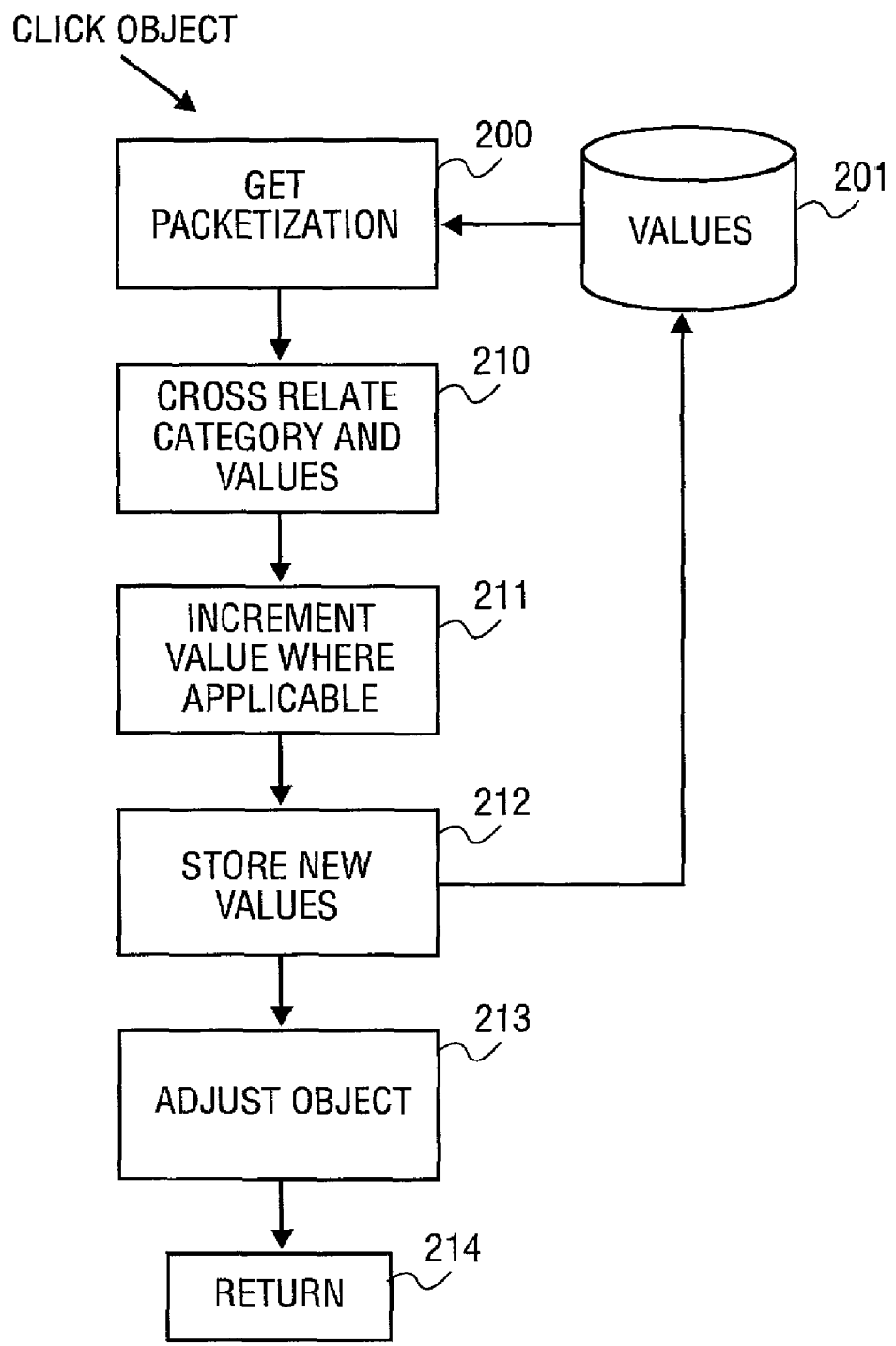
FIG. 2 is a flow diagram describing how a displayed object is incremented due to user selection of specific display information, according to one embodiment.

FIG. 2 illustrates a flow diagram describing how the attribute values of an object are changed after each subsequent selection, according to one embodiment. In step 200, the attribute values of an object 201 are related to a procedure wherein a user selects the object 201 based on user preferences. The attribute values 201 are then cross-related in step 210 between a category of the object (e.g., news being blue, sports being green) and the attribute values to be modified upon each subsequent selection (e.g., border color, object color, transparency, surface texture, etc.). In step 211, one or more of the appropriate attribute values are selected to be incremented in response to the user's selection of the specific object 201 displayed on the screen. Step 212 provides for the new attribute values 201 to be stored back in memory for the specific object for use at the next user selection. In step 213 the visible object is adjusted to use the new attribute values stored in memory 201. At step 214, the incremented attribute values reach a specific expiration limit and the attribute value of the object returns to the initial state that it was in prior to user selection.

In one embodiment, the attribute values may be incremented between a first state, the state of the object prior to initial selection, and a second state, the state of the object prior to an expiration value limit. An expiration value limit may be a time limit (e.g., every 4 hours, every 2 days) or a selection limit (e.g., every 10 selections). The attribute values in 201 may be periodically overwritten with default values when the specific expiration limit has been reached. In addition, in one embodiment, each new event object is created with default attribute values. In some cases, the modified values may expire and return to default values when that object is no longer in active use.

It is clear that various modifications of this scheme can be devised, none of which should change the novel art of allowing the user to recognize, without investigating its content, whether he has recently selected an object or not. And by offering incremental modification of attributes, the user can recognize not only whether he has selected the object before, but also whether he has selected it frequently, as opposed to only once or twice.

The method described above can be stored in the memory of a computer system as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EE-PROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
    in response to receiving a selection of an object displayed by a computing device on a screen, incrementally modifying, by the computing device, a non-textual attribute of the object, wherein each modification results in the object being displayed differently from previous displays of the object unless a limit is reached, and wherein, after each modification, the non-textual attribute visually indicates a number of times the object has been selected.

2. The method of claim 1, wherein incrementally modifying a non-textual attribute of the object includes changing a color of the object.

3. The method of claim 1, wherein incrementally modifying a non-textual attribute of the object includes changing a shape of the object.

4. The method of claim 1, wherein incrementally modifying a non-textual attribute of the object includes changing a surface texture of the object.

5. The method of claim 1, wherein incrementally modifying a non-textual attribute of the object includes changing a transparency of the object.

6. The method of claim 1, wherein incrementally modifying a non-textual attribute of the object includes changing a border color of the object.

7. The method of claim 1, further comprising:
    overwriting, by the computing device, the non-textual attribute with a default value when the limit is reached.

8. The method of claim 1, wherein the limit is a time limit.

9. The method of claim 1, wherein the limit is a selection limit.

10. At least one non-transitory computer-readable medium having computer-readable instructions stored thereon that, when executed, cause at least one computing device to:
    in response to receiving a selection of an object displayed by a computing device on a screen, incrementally modify a non-textual attribute of the object, wherein each modification results in the object being displayed differently from previous displays of the object unless a limit is reached, and wherein, after each modification, the non-textual attribute visually indicates a number of times the object has been selected.

11. The at least one non-transitory computer-readable medium of claim 10, wherein incrementally modifying a non-textual attribute of the object includes changing a color of the object.

12. The at least one non-transitory computer-readable medium of claim 10, wherein incrementally modifying a non-textual attribute of the object includes changing a shape of the object.

13. The at least one non-transitory computer-readable medium of claim 10, wherein incrementally modifying a non-textual attribute of the object includes changing a surface texture of the object.

14. The at least one non-transitory computer-readable medium of claim 10, wherein incrementally modifying a non-textual attribute of the object includes changing a transparency of the object.

15. The at least one non-transitory computer-readable medium of claim 10, wherein incrementally modifying a non-textual attribute of the object includes changing a border color of the object.

16. The at least one non-transitory computer-readable medium of claim 10, having additional computer-readable instructions stored thereon that, when executed, further cause at least one computing device to:
    overwrite the non-textual attribute with a default value when the limit is reached.

17. The at least one non-transitory computer-readable medium of claim 10, wherein the limit is a time limit.

18. The at least one non-transitory computer-readable medium of claim 10, wherein the limit is a selection limit.

19. An apparatus comprising:
at least one processor; and
memory storing computer-readable instructions that, when executed by the processor, cause the apparatus to:
in response to receiving a selection of an object displayed by a computing device on a screen, incrementally modify a non-textual attribute of the object, wherein each modification results in the object being displayed differently from previous displays of the object unless a limit is reached, and wherein, after each modification, the non-textual attribute visually indicates a number of times the object has been selected.

20. The apparatus of claim 19, wherein incrementally modifying a non-textual attribute of the object includes changing a color of the object.

21. The apparatus of claim 19, wherein incrementally modifying a non-textual attribute of the object includes changing a shape of the object.

22. The apparatus of claim 19, wherein incrementally modifying a non-textual attribute of the object includes changing a surface texture of the object.

23. The apparatus of claim 19, wherein incrementally modifying a non-textual attribute of the object includes changing a transparency of the object.

24. The apparatus of claim 19, wherein incrementally modifying a non-textual attribute of the object includes changing a border color of the object.

25. The apparatus of claim 19, wherein the memory stores additional computer-readable instructions that, when executed by the processor, further cause the apparatus to:
overwrite the non-textual attribute with a default value when the limit is reached.

26. The apparatus of claim 19, wherein the limit is a time limit.

27. The apparatus of claim 19, wherein the limit is a selection limit.

* * * * *